(12) United States Patent
Creusot et al.

(10) Patent No.: US 9,818,012 B2
(45) Date of Patent: Nov. 14, 2017

(54) METHOD FOR BARCODE DETECTION, BARCODE DETECTION SYSTEM, AND PROGRAM THEREFOR

(71) Applicant: International Business Machines Corporation, Armonk, NY (US)

(72) Inventors: Clement D. M. Creusot, Tokyo (JP); Asim Munawar, Verena (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/953,781

(22) Filed: Nov. 30, 2015

(65) Prior Publication Data

US 2016/0154987 A1    Jun. 2, 2016

(30) Foreign Application Priority Data

Dec. 2, 2014   (JP) ................................ 2014-244076

(51) Int. Cl.
| | |
|---|---|
| *G06K 7/10* | (2006.01) |
| *G06K 7/14* | (2006.01) |
| *G06K 9/00* | (2006.01) |
| *G06K 9/32* | (2006.01) |
| *G06K 9/46* | (2006.01) |

(52) U.S. Cl.
CPC .............. *G06K 7/1443* (2013.01); *G06K 9/00* (2013.01); *G06K 9/3208* (2013.01); *G06K 9/4633* (2013.01)

(58) Field of Classification Search
USPC ... 235/494, 462.01–462.091, 462.09, 462.08
See application file for complete search history.

(56) References Cited

U.S. PATENT DOCUMENTS

| | | | |
|---|---|---|---|
| 7,303,130 B2* | 12/2007 | Solen ....................... | G06K 7/14 235/462.01 |
| 2001/0006191 A1 | 7/2001 | Hecht et al. | |
| 2002/0084330 A1* | 7/2002 | Chiu ........................ | G06K 7/10 235/462.11 |
| 2002/0162889 A1* | 11/2002 | Navon ..................... | G06K 7/14 235/462.14 |
| 2006/0147094 A1* | 7/2006 | Yoo ..................... | G06K 9/00604 382/117 |

(Continued)

OTHER PUBLICATIONS

Bodnar, et al., Improving Barcode Detection with Combination of Simple Detectors, 2012 Eighth International Conference on Signal Image Technology and Internet Based Systems.

(Continued)

*Primary Examiner* — Tuyen K Vo
(74) *Attorney, Agent, or Firm* — Rabin Bhattacharya

(57) ABSTRACT

A method for barcode detection, barcode detection system and program. In method for detecting a barcode, an information processing apparatus executes the steps of: detecting a plurality of blobs from an image; for each detected blob, obtaining imaginary lines bisecting the detected blob perpendicular at the middle of the detected blob, determining at least one cluster of the imaginary lines in a feature space according to slopes and positions of the imaginary lines and grouping the blobs in one cluster to a rectangular shape corresponding to the barcode.

14 Claims, 11 Drawing Sheets

(56) References Cited

U.S. PATENT DOCUMENTS

| | | | | |
|---|---|---|---|---|
| 2009/0001165 A1* | 1/2009 | Zhang | ............... | G06K 7/1093 235/462.11 |
| 2010/0163632 A1* | 7/2010 | Tseng | ............... | G06K 9/3233 235/494 |
| 2011/0007967 A1* | 1/2011 | Soderberg | ............ | G06K 7/14 382/165 |
| 2011/0290877 A1* | 12/2011 | Sun | ..................... | G06K 7/14 235/436 |

OTHER PUBLICATIONS

Bodnar, et al., Barcode Detection with Uniform Partitioning and Distance Transformation, Proceedings on the IASTED International Conference on Computer Graphics and Imaging, 2013.

Bodnar, et al, A Novel Method for Barcode Localization in Image Domain, ICIAR 2013.

Juett, et al, Barcode Localization Using a Bottom Hat Filter, NSF Research Experience for Undergraduates, 2005.

Katona, et al., A Novel Method for Accurate and Efficient Barcode Detection with Morphological Operations, 2012 Eighth International Conference on Signal Image Technology and Internet Based Systems.

Katona, et al., Efficient 1D and 2D Barcode Detection Using Mathematical Morphology, Proc. International Symposium on Mathematical Morphology and Its Applications to Signal and Image Processing, ISMM'13, pp. 464-475, 2013.

Matas, et al, Robust Wide Baseline Stereo From Maximally Stable Extremal Regions, In Proc. of the British Machine Vision Conference, pp. 384-393, 2002.

Wachenfeld, et al., Robust Recognition of 1-D Barcodes Using Camera Phones, 19th International Conference on Pattern Recognition, 2008.

Zamberletti, et al, Robust Angle Invariant 1D Barcode Detection, 2013 Second IAPR Asian Conference on Pattern Recognition, pp. 160-164, Nov. 2013.

Ren, Xiaofeng, "Figure-ground segmentation improves handled object recognition in egocentric video," In Computer Vision and Pattern Recognition (CVPR), 2010, IEEE Conference, pp. 3137-3144, 2010.

\* cited by examiner

METHOD FOR BARCODE DETECTION, BARCODE DETECTION SYSTEM, AND PROGRAM THEREFOR

CROSS-REFERENCE TO RELATED APPLICATION

This application claims the benefit of priority to Japanese Patent Application No. 2014-244076, filed Dec. 2, 2014, the contents of which are incorporated herein by reference.

BACKGROUND

The present invention relates to barcode detection and the improved precision and real time aspect of barcode detection.

A barcode is widely used for tagging various commercial products and goods etc. Usually, the barcodes can be read by a sophisticated barcode laser reader to obtain the identification numbers encoded as barcodes. However, the information encoded to the barcode can be useful for customers if the barcode is decoded by devices of the customers.

Recently, various mobile apparatus such as a smartphone, a tablet type computer, or wearable devices become popular; such mobile devices are also equipped with a camera facility and a decoder of the encrypted code such as QR code. Though encoding specifications such as QR code are known and widely used, the linear barcode is still one of the major encoding specification for tagging the goods, products or other commercial objects. Therefore, it is useful to read the barcode of objects in real time.

There are many existing technologies for detecting the barcode. For example, Hough transformation for detection of the bars in the barcode succeeded to recognize the bar in the barcode; however, a lot of false positive lines have been recognized leading to the miss-detection of the barcode.

SUMMARY

Generally, embodiments of the present invention provide a barcode detection system with high recognition ability of the barcode by a mobile apparatus.

In one aspect of the present invention, there is provided a method for detecting a barcode. The method includes: detecting a plurality of blobs from an image; for each detected blob, obtaining imaginary lines bisecting the detected blob perpendicular at the middle of the detected blob; determining at least one cluster of the imaginary lines in a feature space according to slopes and positions of the imaginary lines; and grouping the blobs in one cluster to a rectangular shape corresponding to the barcode.

According to another aspect of the present invention, there is provided a non-transitory computer readable storage medium tangibly embodying a computer readable program code having computer readable instructions which, when implemented, cause a computer device to carry out the steps of a method for detecting a barcode. The method includes: detecting a plurality of blobs from an image; for each detected blob, obtaining imaginary lines bisecting the detected blob perpendicular at the middle of the detected blob; determining at least one cluster of the imaginary lines in a feature space according to slopes and positions of the imaginary lines; and grouping the blobs in one cluster to a rectangular shape corresponding to the barcode.

According to another aspect of the present invention, there is provided a barcode detection system including an information processing apparatus. The information processing apparatus includes: an image storage part including a memory, the memory storing an image including at least one barcode; a blob filtering part, the blob filtering part allocating rectangular shapes to the blobs and deleting rectangular shape having height and width ratios depending on a predetermined threshold; and a clustering part for generating imaginary lines bisecting the blobs, applying Hough transformation to generate feature vectors in a feature space defined in Cartesian coordinate system and projecting the feature vector to the feature space; wherein the clustering part clusters the feature vectors depending on a distance in the feature space so as to clustering the feature vectors to the rectangular shape.

DETAILED DESCRIPTION

Figure 1:
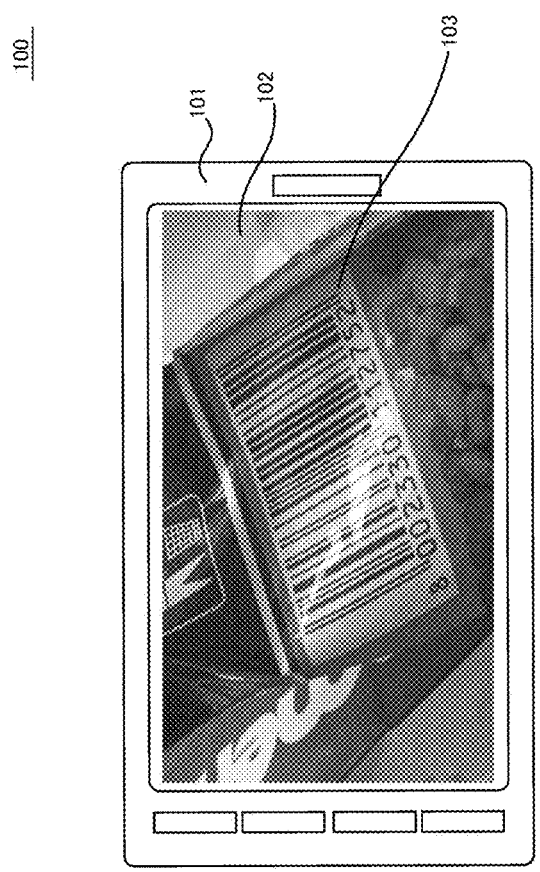
FIG. 1 shows the embodiment of the present barcode detection system 100.

Now, the present invention will be described using particular embodiment associated by drawings; however, the particular embodiments are only described for understanding the present invention rather than limitation thereof. FIG. 1 shows the embodiment of the present barcode detection system 100. Barcode detection system 100 may be implemented in any type of information processing apparatuses, for example, smartphone 101 with an adequate operating system, hereafter referred to simply to OS. The mobile apparatus may not be limited to smartphone 101, a tablet type computer, a notebook computer or a desktop computer and a server computer as well as a wearable device including a camera facility can be used in the present invention. Now, the present invention will be explained by assuming that the information processing apparatus is implemented as smartphone 101 in order to simplify the description.

In the embodiment shown in FIG. 1, the display of smartphone 101 displays the image of the object to which barcode 103 is printed. The present invention can determine and detect barcode 103 from the image obtained by the mobile apparatus. As shown in FIG. 1, the image of barcode 103 is distorted by the shape of the object and the light reflections decreases line contrasts in the barcode. The barcodes in the present invention can be selected from the encoding from JAN code, ITF code, ITF-14 code, NW-7 code, CODE39, CODE128, UPC, UPC-A, UPC-E, or GS1. Barcode detection system 100 can obtain the barcode information from the still image or moving image depending on particular setting of the apparatus.

Figure 2:
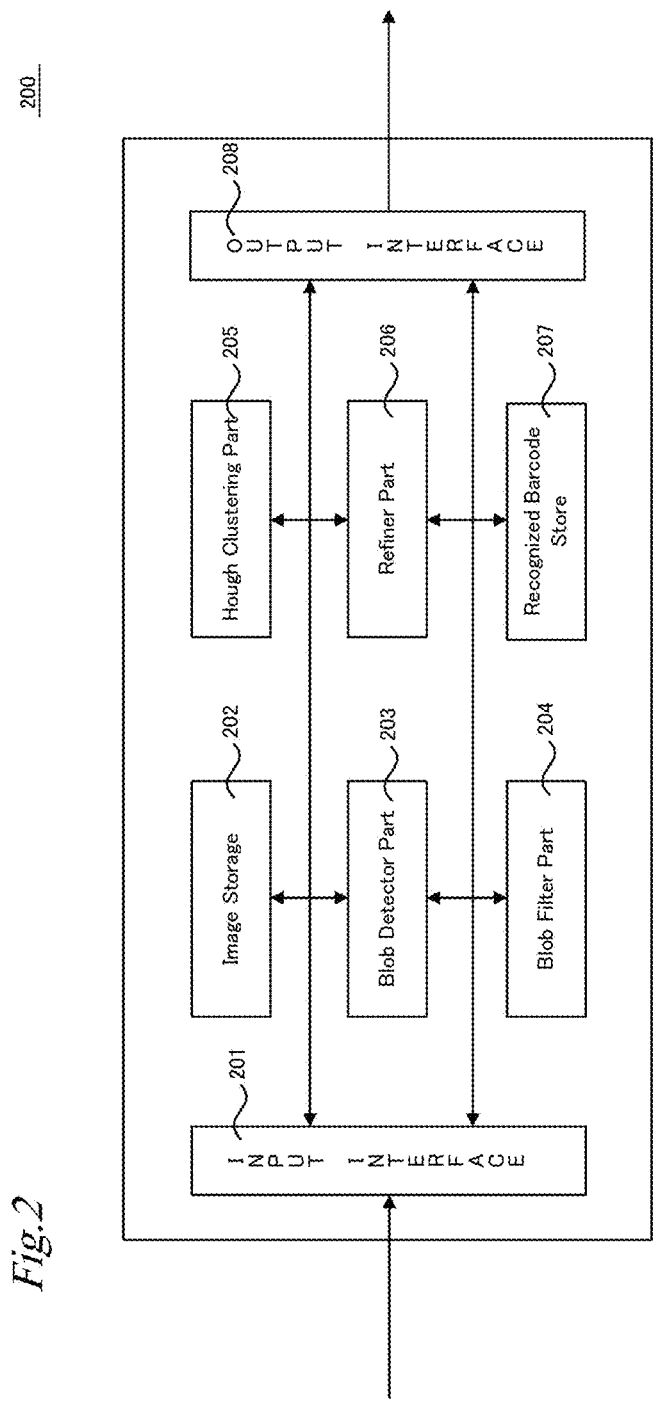
FIG. 2 shows the software implementation of the information processing apparatus used in the present barcode detection system 100.

FIG. 2 shows software implementation 200 of the present information processing apparatus. The software modules shown in FIG. 2 can be realized by running the software on a CPU of the information processing apparatus. The modules of the information processing apparatus can include image storage part 202, blob detector part 203, and blob filter part 204.

Image storage part 202 stores the still image or video frames captured by a camera facility of the information processing apparatus or received through a network such as internet through input interface 201. Blob detector part 203 detects the blobs in the image by using conventional MSER technique. The detected blobs may be subjected to blob filter part 204 to eliminate noise blobs by determining sizes such as the length and/or width to improve line detection accuracies.

The information processing apparatus can include the software modules such as Hough clustering part 205, refining part 206, and recognized barcode store part 207. Hough clustering part 205 performs the clustering of the blobs according to the present invention. Hough clustering part 205 defines an imaginary line for the blob that intersects the middle point of the blob and extending perpendicular to the blob. Hough clustering part 205 further applies the Hough transformation to the imaginary lines for the purpose of the line recognition and generates the feature vectors of each of the imaginary lines. Then Hough clustering part 205 projects the feature vectors to the Hough space, i.e. feature space defined in Cartesian coordinate making it possible to cluster the feature vectors, i.e. imaginary lines and in turn to cluster the blobs to particular rectangular shapes corresponding to barcode regions.

The rectangular shapes can correspond to a "bounding box" defining the recognized barcode region. Hereafter, the term "rectangular shape" refers to the region of blobs to be estimated or detected as the barcode. Hough clustering part 205 further allocates the blobs to the particular rectangular shapes according to the results of clustering. In this stage, rough barcode candidates can be generated. The detail of the Hough clustering part will be explained later.

Refining part 206 refines the above rough barcode candidates by eliminating blobs by considering gaps between the blobs and the barcode regulations and also merges the rectangular shapes to be reasonably merged into one barcode to generate the final rectangular shape as the results of recognition. Recognized barcode store part 207 stores the final barcode data for decoding the information encoded in the barcode.

The information processing apparatus can include output interface 208 for providing human interfaces or data transmissions through Internet or the public telephone network. In one embodiment of the present invention, the information processing apparatus can be implemented as the mobile apparatus and the mobile apparatus can include the functional modules depicted in FIG. 2. In another embodiment of the present invention, the mobile apparatus includes the camera facility and the mobile apparatus takes the image of objects with the barcodes and sends the image to a remote computer such as a server computer to ask the barcode recognition and to receive the decoded information. Such embodiment can be useful when the mobile apparatus is implemented as so-called wearable device with light weight and power limitation.

Figure 3:
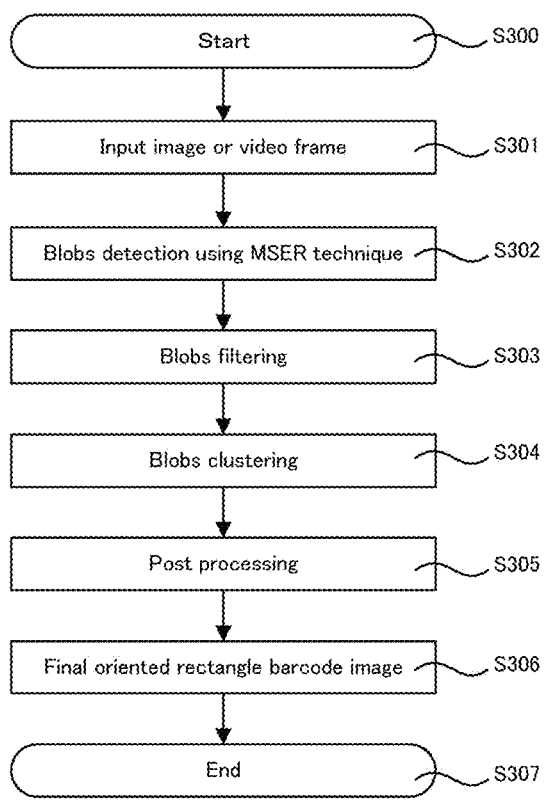
FIG. 3 shows the flowchart for the global process executed in the present barcode detection system.

FIG. 3 shows the flowchart for the global process executed in the present barcode detection system. The process starts from step S300 and in step S301, the image of the object is taken by the camera facility. Here, the image of the object can be the still image or the video frame. Furthermore, according to the present invention, the image can include a plurality of barcode images in one shot or frame. Next, the process determines in step S302 the blobs of the barcode using MSER technique.

Then in step S303, the process filters the blobs to be the barcodes using shape, height and width ratio and then the process clusters the blobs into the particular rectangular shapes which can be barcode candidates in step S304. Then the process applies the post processing to refine the blobs within the barcode candidates defined as the rectangular shape and ^or to re-allocate the rectangular shapes into one rectangular shape in step S305. Then the process determines final recognition results as the barcode and stores the results in an adequate memory spaces in step S306 and the process goes to step S307 to end.

Figure 4:
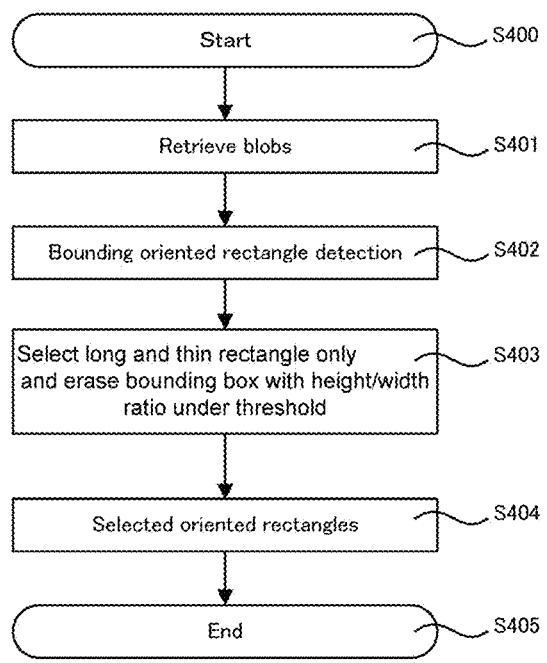
FIG. 4 shows the process for the filtering process starts from step S400.

Now, the detailed processing of step S303, i.e. filtering process will be detailed. FIG. 4 shows the process for the filtering process and the process starts from step S400 and in step S401 the blobs to be subjected to the processing are retrieved form image storage 202. Then, the process allocates the rectangle shape to the blob or blobs using a certain length and width for typical barcode regulation in step S402. The particular embodiment of the present invention uses the threshold of 10 for the ratio of length to height (hereafter referred to aspect ratio).

In this process, the rectangle shape for the blob or blobs can be identified by its center position Ci, width wi, and the orientation angle αi. Here, the term orientation angle αi refers to the in-plane slant angle of the rectangular shape in the image. When the rectangular shape having the aspect ratio smaller than the numeral one is present, the coordinates of the recognition can be rotated by 90 degrees to taken into account for incorporating into barcode candidates. In step S403, the process deletes the rectangle shapes using the size criteria of long and thin shapes according to the barcode specification as well as the threshold aspect ratio and then selects the oriented and meaningful rectangular shape for the barcode candidates in step S404 and thereafter the process goes to step S405 to end the filtering. The above deletion can omit efficiently unnecessary noise blobs from the recognition.

Figure 5:
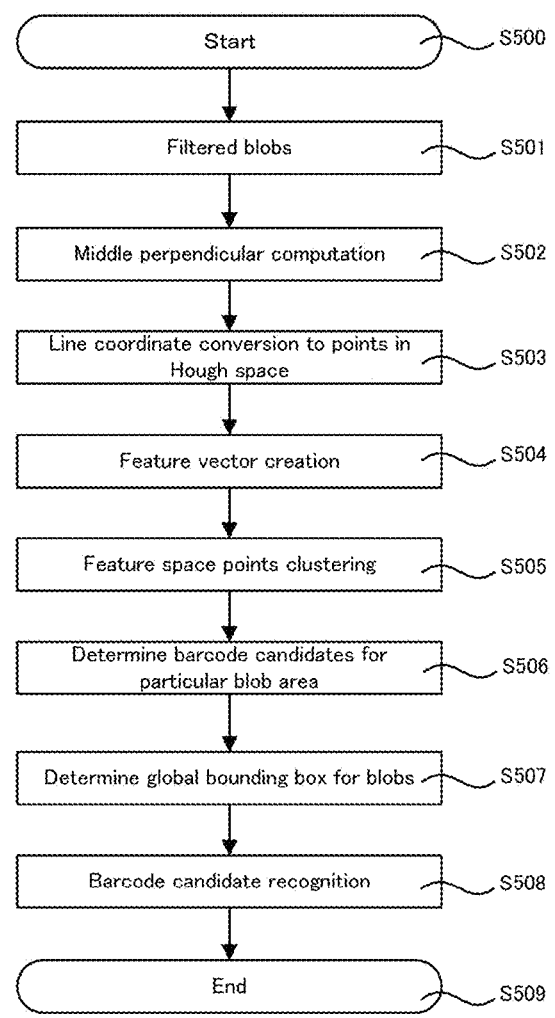
FIG. 5 shows the process for the blob clustering of step S305 in FIG. 3.

FIG. 5 shows the process for the blob clustering of step S304 in FIG. 3. The process starts from step S500 and in step S501, the data of filtered blobs are retrieved from an adequate memory space and then the middle perpendicular line, i.e. bisecting imaginary lines of the blobs are computed in step S502. This process is novel over the conventional process using simple Hough transformations. The present invention uses the above imaginary lines to clustering the blobs of the barcode lines into particular barcode candidate by the Hough transformation.

Here, the imaginary lines can be expressed as the formula "$y = a_j x + b_j$" and the suffix "j" is the identification value of each imaginary line. If the blobs are included in the particular barcode candidate, the plots to the Hough space (in Cartesian coordinate system (b, a)) can provide cluster or clusters around the line indicating ideally the same slope for the blobs. Hereafter the Hough space will be referred to feature space in this description. Then, in step S503, parameters of the imaginary lines are converted to the coordinate system in the Hough space to create feature vectors ($b_j$, $a_j$) in the Hough space in step S504.

Figure 6:
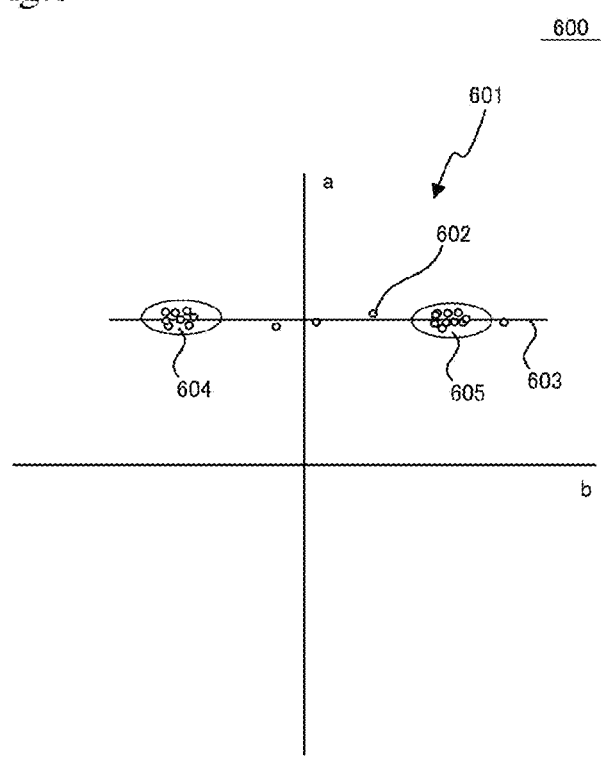
FIG. 6 shows plots 600 to the Hough space according to the present invention.

FIG. 6 shows conceptual plots 600 to the Hough space according to the present invention. The plots shown in FIG. 6 are assumed that the imaginary lines are slant in the image in the slope angle of arctan ($a_j$) for simplify the explanation. When the parameters ($b_j$, $a_j$) of the calculated imaginary lines, which can be referred as the feature vectors, are plotted to Hough space 601, the imaginary lines belonging to the same barcode and having ($b_j$, $a_j$) can have the same parameter "a" by showing line 603; in practical implementation, position and the angle are used. If the same processing is applied to the clear barcode, the similar plots converge to the single point on the coordinate "a" in the feature space. FIG. 6 shows the appearances of cluster 604 and cluster 605. When the barcode is present in the image, the bars of the barcode should present within the rectangular region with the same slope which in turn indicates that the slope of the imaginary lines can be same. This means that ideally the plots in the imaginary lines to the feature space will provide the singular point without considering noises. The clustering can be conducted by setting the threshold distance to be determined to the same barcode and minimal numbers of points to be included in the barcode.

The process then clusters the feature vectors in the feature space to select the blobs to be allocated to unit rectangular shape in step S505. In the particular embodiment of the present invention, the feature vectors in the feature space can be used for discriminating the boundaries of the barcode area; the strategy can include two parameters (1) maximal distance in the feature space between clusters of the feature vectors and (2) the minimal number of items in the clusters, because the feature vectors represents the imaginary lines in the blobs and then the feature vectors to be included in the same rectangular shape can distribute having certain distances along to the horizontal b axis in the future space including the minimal number of the feature vectors. The distance and the number of items can be selected depending on the particular applications. Of course the present invention can use another clustering strategy for the clustering strategy depending on particular implementation.

In step S506, the process determines the barcode candidates for the particular rectangular shape and then determines global bounding boxes for blobs to be recognized as the barcode in step S507. Further then, the process determines tentative barcode candidates as the rectangular shapes and the results can be stored in an adequate memory space in step S508 and the process goes to step S509 to end.

Figure 7:
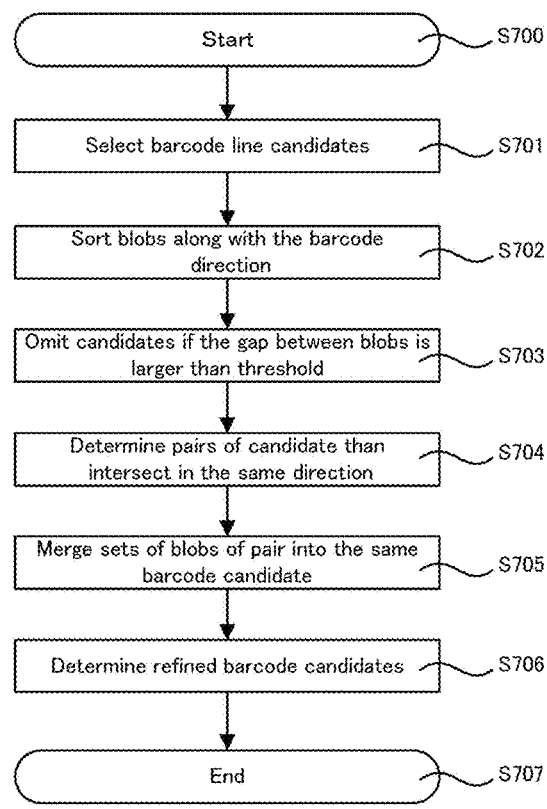
FIG. 7 shows the process for the post processing in step S306 depicted in FIG. 3.

FIG. 7 shows the process for the post processing in step S305 depicted in FIG. 3. The post processing is the process for refining the barcode recognition by omitting line noises from the barcode lines or merging the rectangular shapes. The process starts from step S700 and in step S701, the process select the barcode line candidates in the particular rectangular shape. Then in step S702, the process sorts the line blobs along with the barcode direction, i.e. the direction of the imaginary line and omits in step S703 the candidate line blob or blobs by the criteria whether or not the gap between the subjected line blobs is larger than a given threshold. This threshold can be determined by the requirements of the barcode specifications. Then the process determines pairs of candidate lines other than intersect in the same line in step S704.

The process determines whether or not the sets of line blobs are to be categorized into one barcode and if such pairs are present, the process merges the sets of blobs into the same one barcode candidate in step S705 and then the process refines barcode candidate. The criteria for merging can be the minimal and maximal gap lengths of the line blob; when two barcode candidates are present in close proximity in the distance between the minimal and maximal values, such adjacent rectangular shapes can be merged into one rectangular shape when considering the positions along the bisecting line is close enough. Other merge criteria can be used in the present invention depending on particular applications. When the process determines the refined barcode candidates for all of the blobs in step S706, the process goes to step S707 to end.

Figure 8:
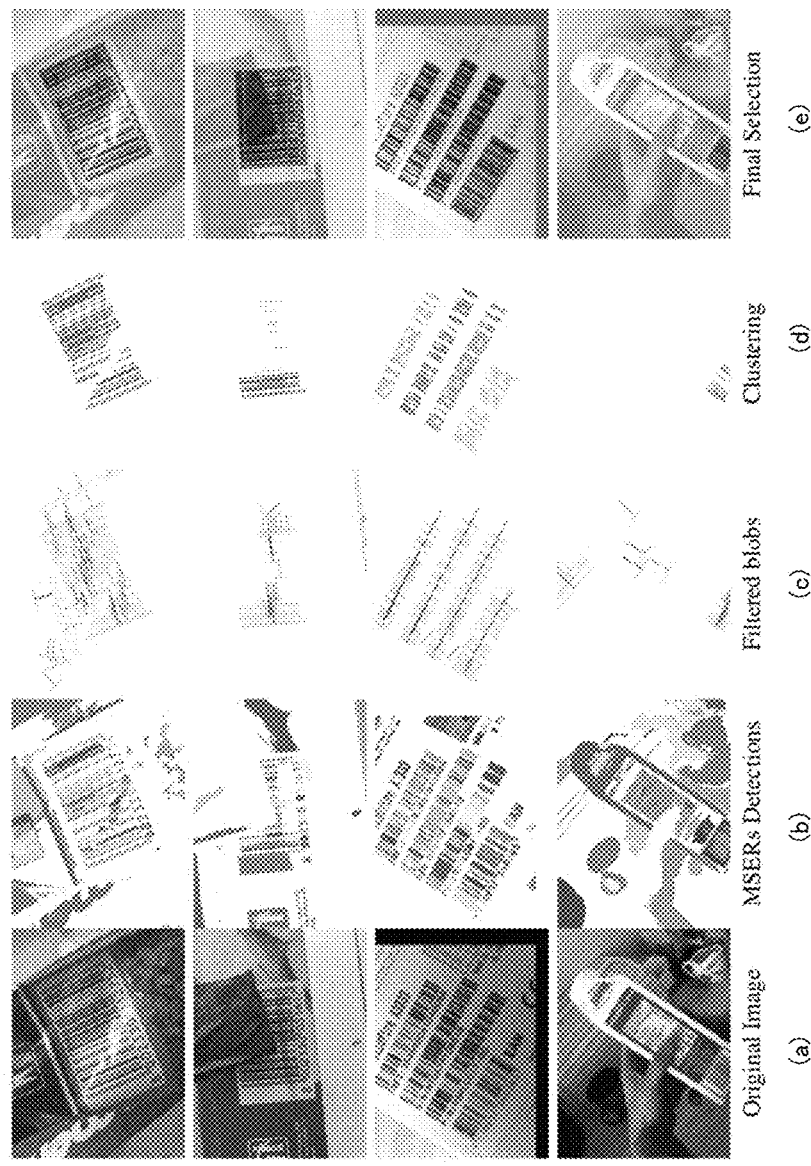
FIG. 8 shows the image representation of the process of the present embodiments using sample barcode images.

FIG. 8 shows the image representation of the present embodiments using sample barcode images. The sample barcode images are; (1) ArTe-Lab Rotated Dataset and (2) Intel Egocentric Object Recognition dataset.

The processing proceeds from (a) to (e) and the results in the column (e) are obtained after the processing of the post processing described in FIG. 7 and the finally determined blocks are indicated by the respective rectangles. As shown in FIG. 8 it is shown that the present invention shows good recognition about the barcodes whatever the barcodes are present in one image and the image include the image such as the human hand, cups, and other objects other than the barcodes.

Figure 9:
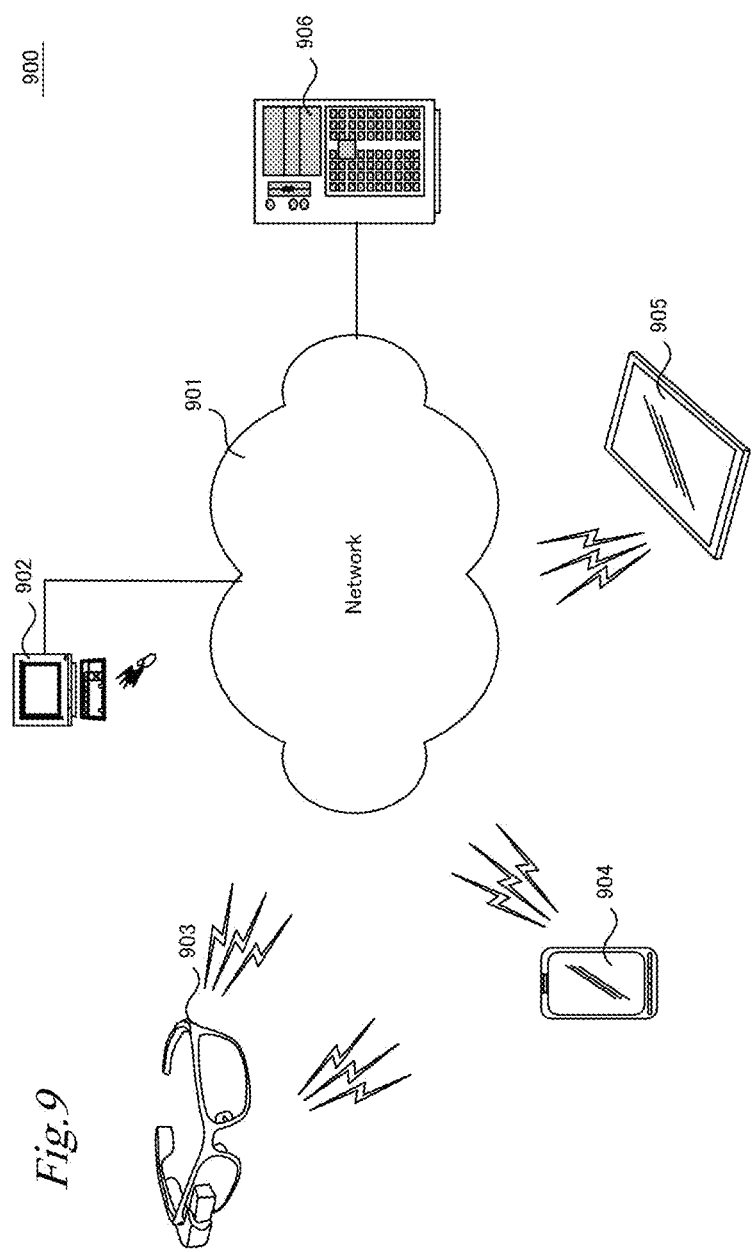
FIG. 9 shows an alternative embodiment 900 of the present invention where the program of the present invention is implemented on server computer 906.

FIG. 9 shows an alternative embodiment 900 of the present invention where the program of the present invention is implemented on server computer 906. The embodiment of FIG. 9 can be useful when the mobile apparatuses have simple and relatively low performance with respect to smartphone 904 and the tablet type computer. Such case can occur when the mobile apparatus is implemented as wearable device 903. The wearable device cannot be limited to the eye glass type one and other types such as hand-set type, chest-set type, arm-set type and head-set type device can be possible.

For example, wearable device 903 looks the barcode within the scope thereof. When the user want to know the information encoded to the barcode, the user takes the image of the barcode and sends the image to server 906 using an appropriate data transfer protocol such as HTTP. Server 906 can be implemented with the program of the present invention and can analyze the received barcode image according to the present invention.

After analysis of server, the result of the analysis can be returned to wearable device 903 so as to provide the information that is encoded in the barcode. The embodiment depicted in FIG. 9 can be adequately implemented so-called as the "cloud service" which allows users to bring lighter devices than smartphone 904 and also allows users to access the information of the barcode without positioning the mobile devices on the objects. In further another embodiment, smartphone 904 can receive the barcode image from the wearable device and decode the barcode. Then, the decoded information can be returned to wearable device 903 such that the user of the wearable device can use the decoded information.

The first dataset was selected from the ArTe-Lab Rotated Barcode Dataset (extended version) 1. It included of 365 images containing EAN barcodes captured with different phones. The results given in Robust Wide Baseline Stereo from Maximally Stable External Regions used only a subset of 129 of those images for the evaluations. In the present invention, the results were compared using the full set of the sample images. The second dataset was the WWU Muenster Barcode Database2 from Robust recognition of 1-d barcodes using camera phones, In Proc. of 19th International Conference on Pattern Recognition. It contained 1,055 pictures of EAN and UPC-A barcodes taken with a N95 mobile phone.

To simplify the comparisons we use the same metric as Robust angle invariant 1 d barcode detection, In Pattern Recognition. The main measure aims at evaluating the overall bounding box detection accuracy using the Jaccard index between the ground truth and the detection. Both the detection result R and the ground truth G are given as binary masks over the whole image by the following formula. The data sets used in this example were summarized in Table 1.

[Formula 1]

$$J(R, G) = \frac{|R \cap G|}{|R \cup G|} \quad (1)$$

TABLE 1

| Datasets: | ArTe-Lab [12] | Muenster [11] |
|---|---|---|
| #Images | 365 | 1055 |
| #Ground-Truth | 365 | 595 |
| Dimensions | 640 × 480 | 640 × 480* |
| Device | Nokia 5800 + others | Nokia N95 |

*Other dimensions are available up to 2592 × 1944.

Datasets Details

Figure 10:
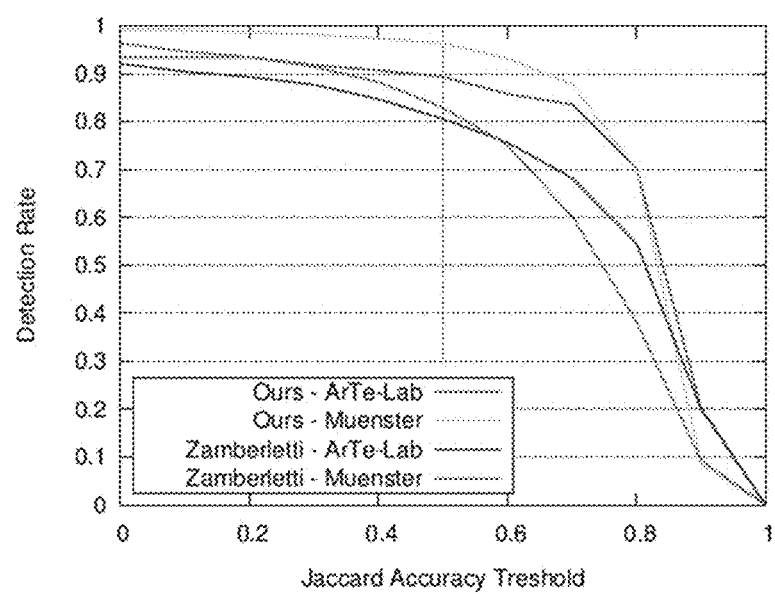
FIG. 10 shows the results for the two datasets represented as the graphical representation.

In this invention, $J_{avg}$ in Robust angle invariant 1 d barcode detection, In Pattern Recognition was referred to the average Jaccard accuracy over the dataset. The overall detection rate D corresponded to the proportion of the files in the dataset achieving at least 0.5 Jaccard accuracy (also called $OA^{bb}$ in Robust wide baseline stereo from maximally stable external regions):

[Formula 2]

$$D = \frac{\#(i \in S \mid J(R_i, G_i) \geq 0.5)}{|S|} \quad (2)$$

wherein S is the set of files in the dataset. For completeness and the detection for varying accuracy thresholds was set in steps of 0:1. The results for the two datasets are summarized in FIG. 10 as the graphical representation.

The comparisons of the detection accuracies between our method and prior art are listed in Table 2. For a Jaccard threshold of 0:5, the present invention succeeded in detecting the barcodes in 89.3% of the images for the ArTe-Lab Rotated dataset and in 96.3% for the Muenster dataset compared to 80.5% and 82.9%, respectively, with the reference technique. The complete detection profile can be seen for the two methods on both datasets in FIG. 10.

| | Accuracy $J_{avg}$ | | Detection Rate D | |
|---|---|---|---|---|
| Datasets | Reference | Expl. | Reference | Expl. |
| ArTe-Lab | 0.695 | 0.763 | 0.805 | 0.893 |
| Muenster | 0.682 | 0.799 | 0.829 | 0.963 |

Detection Results on the Two Datasets

As described above, the present invention can improve detection of about 14% over the state-of-the-art on average over the two datasets.

The inventors further examined real-time barcode recognition performance. The present method runs at around 10 frames per second on 640×480 images. In Table 3, the comparison of the present performances with Z in prior art (referred to Reference) while running with a single thread on the same Dell XPS 9100 machine. Both methods were implemented in C++ and use the OpenCV Library.

The most computationally expensive part was the MSERs computation that took an average of 49 ms per frame. The filtering, feature detection, and clustering took respectively 18, 6, and 25 milliseconds. Note that only the MSERs detection computation depended directly on the size of the image.

TABLE 3

| Datasets | Reference | Example |
|---|---|---|
| ArTe-Lab | 0.135 | 0.105 |
| Muenster | 0.130 | 0.115 |

Average Computation Time Ins Seconds

The other parts depended on the number of candidate blobs. Therefore, the computation of the last three steps should not increase much for higher resolution images. On 640×480 images the present methods (referred to Example) contributed to a speed-up of around 1.2 over the reference method. A live mode of the present program using a webcam video stream in input showed significantly the improvement in the real-time capability of the present invention.

Figure 11:
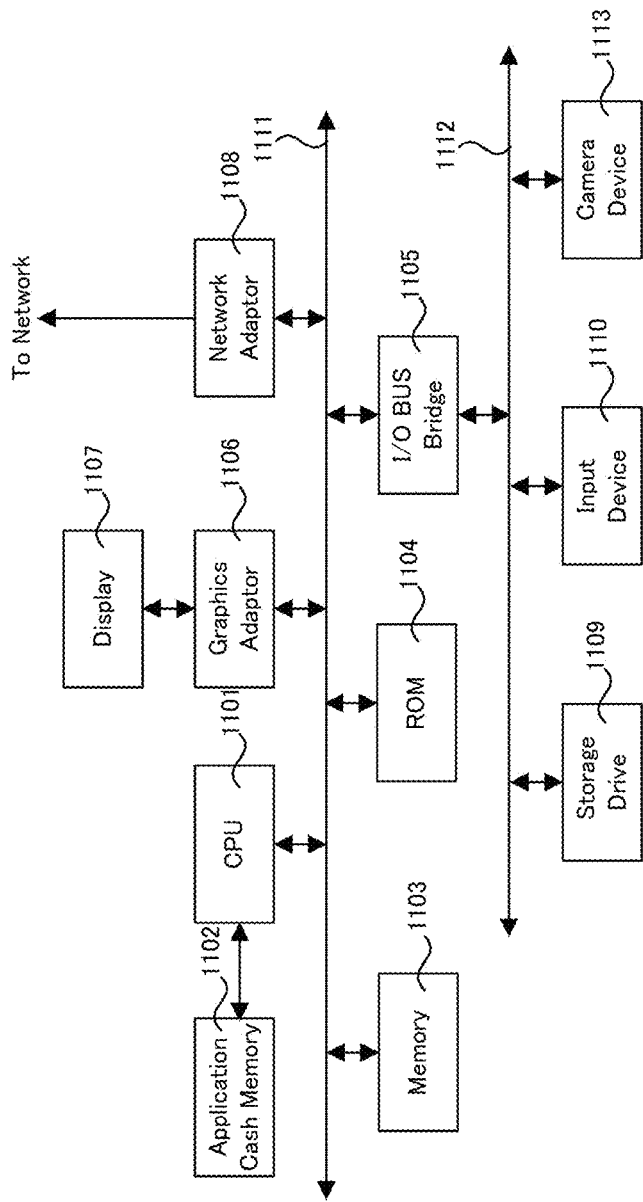
FIG. 11 shows the hardware implementation of the information processing apparatus used in the present barcode detection system 100.

FIG. 11 shows the hardware implementation of the information processing apparatus used in the present barcode detection system 100. Information processing apparatus 1100 includes central processing unit (CPU) 1101, the application cache memory 1102, and memory 1103 interconnected through system bus 1111. CPU 1101 reads the program described in the present invention in memory 1103 from high volume storage drive 1109 such as the hard disk drive, the tape drive or the solid state disk and executes the programming code of the present invention. The application cache memory can be referred to application cache for improving data access of CPU 1101.

Information processing apparatus 1100 further includes ROM 1104, graphics adaptor 1106, and network adaptor 1108. ROM 1104 stores BIOS for initializing the information apparatus and for performing initial test. Graphics adaptor 1106 provide the video image under VGA or XGA etc. to display 1107 for providing a human interface to information processing apparatus 1100. Network adaptor 1108 connects information processing apparatus 1100 to the network through an appropriate transmission protocol such as TCP/IP, UDP. In the particular embodiment, the mobile apparatus may further include a cellular phone facility to make it possible to make telephone call.

Information processing apparatus 1100 includes I/O bus bridge 1105 such as PCI bridge and connects various devices through the I/O bus 1112 such as storage device 1109, input devices 1110 such as an input button, a software key board, or camera device 1113 etc. The mobile apparatus may include simpler modules when the mobile apparatus is implemented as the wearable device.

The information processing apparatus runs the program codes of the present invention on an appropriate operating system (OS) such as Z/architecture (trademark), Linux (Trademark), Unix (Trademark) or Windows (Trademark) depending on the particular implementation of the apparatus, but not limited thereto, ANDROID (Trademark), Chrome (Trademark), or IOS (Trademark) may be available. The program of the present invention may be written by appropriate programming languages such as C, C++, C# etc. depending on the OS.

The corresponding structures, materials, acts, and equivalents of all means or step plus function elements in the claims below, if any, are intended to include any structure, material, or act for performing the function in combination with other claimed elements as specifically claimed. The description of at least one aspect of the present invention has been presented for purposes of illustration and description, but is not intended to be exhaustive or limited to the invention in the form disclosed.

Therefore, it is possible to read the barcode on objects by the information processing apparatus such as mobile devices and decode thereof real time scale. Furthermore, the objects to which the barcode is printed are sometimes flexible as plastic packages. Then, the outward appearance of the barcode cannot always be precise parallel aligned lines.

An object of the present invention is to provide a barcode detection system with improved robustness for recognizing the barcodes closely disposed or overlapped each other.

Further another object of the present invention is to provide a method for barcode detection in real time while having improved robustness.

Furthermore, a plurality of barcodes sometimes can be printed on the object adjacent each other and then this situation arises another problem for identifying the barcode set in the object image.

The products, goods and other commercial objects can be traded widely and be sold in many countries and then the customers or operators of objects want to know the information encoded in the barcode by the native language in real time scale.

According to the present invention, the barcode detection technique with improved recognition accuracy and improved computing speed such that the present invention can be suitably applicable to mobile apparatuses such as smart phones, tablet type computers, and wearable devices which can provide hands-free environments.

Many modifications and variations will be apparent to those of ordinary skill in the art without departing from the scope and spirit of the invention. The embodiment was described in order to best explain the principles of the invention and the practical application, and to enable others of ordinary skill in the art to understand the invention for various embodiments with various modifications as are suited to the particular use contemplated.

What is claimed is:

1. A method for detecting a barcode, comprising:
   detecting a plurality of blob regions from an image;
   for each detected blob in the blob region, obtaining imaginary lines bisecting the detected blob perpendicular at the middle of the detected blob;
   determining at least one cluster of the imaginary lines in a feature space according to slopes and positions of the imaginary lines; and
   grouping the blobs in one cluster into a rectangular shape corresponding to the barcode.

2. The method of claim 1, wherein the method further comprises the step of:
   allocating at least one rectangular shape to a blob region corresponding to the barcode and deleting the rectangular shape depending on the size of the barcode before obtaining the imaginary lines.

3. The method of claim 1, wherein the method further comprises the step of:
   refining allocation of the blobs to at least one rectangular shape after the step of grouping by using gaps between the blobs.

4. The method of claim 1, wherein the step of determining at least one cluster comprises the step of:
   applying a Hough transformation to the imaginary lines and generating a feature vector with respect to each of the imaginary lines.

5. The method of claim 1, wherein the step of determining at least one cluster further comprises the step of:
   clustering the feature vectors into at least one cluster depending on distances in the feature space defined in Cartesian coordinate system.

6. A non-transitory computer readable storage medium tangibly embodying a computer readable program code having thereon computer readable instructions which, when implemented, cause a computer device to carry out the steps of a method for detecting a barcode, the method comprising:
   detecting a plurality of blob regions from an image;
   for each detected blob in the blob region, obtaining imaginary lines bisecting the detected blob perpendicular at the middle of the detected blob;
   determining at least one cluster of the imaginary lines in a feature space according to slopes and positions of the imaginary lines; and
   grouping the blobs in one cluster to a rectangular shape corresponding to the barcode.

7. The computer readable storage medium according to claim 6, wherein the method further comprises the step of:
   allocating at least one rectangular shape to a blob region corresponding to the barcode and deleting the rectangular shape depending on a size of the barcode before obtaining the imaginary lines.

8. The computer readable storage medium according to claim 6, wherein the method further comprises the step of:
   refining allocation of the blobs to at least one rectangular shape after the step of grouping by using gaps between the blobs.

9. The computer readable storage medium according to claim 6, wherein the step of determining at least one cluster comprises the step of:
   applying a Hough transformation to the imaginary lines and generating a feature vector with respect to each of the imaginary lines.

10. The computer readable storage medium according to claim 6, wherein the step of determining at least one cluster further comprises the step of:
    clustering the feature vectors into at least one cluster depending on distances in the feature space defined in Cartesian coordinate system.

11. A barcode detection system comprising an information processing apparatus, which comprises:
    an image storage part comprising a memory, the memory storing an image including at least one barcode;
    a blob filtering part for allocating rectangular shapes to the blobs and deleting rectangular shape having height and width ratios depending on a predetermined threshold; and a clustering part for generating imaginary lines bisecting the blobs by applying Hough transformation to generate feature vectors in a feature space defined in a Cartesian coordinate system and projecting the feature vector to the feature space;

wherein the clustering part clusters the feature vectors depending on a distance in the feature space to cluster the feature vectors into the rectangular shape.

12. The barcode detection system of claim 11, wherein the information processing apparatus further comprises:

a refining part and the refining part omits the blobs in a particular rectangle shape depending on gaps between the blobs.

13. The barcode detection system of claim 12, wherein the refining part merges the rectangular shapes into one different rectangular shape depending on minimal and maximal gap lengths of the blobs.

14. The barcode detection system of claim 11, wherein the image including at least one barcode is received from a network by the information processing apparatus and returned a recognition result to an apparatus connected to the network.

* * * * *